United States Patent
Zikeli et al.

[11] Patent Number: 5,826,978
[45] Date of Patent: Oct. 27, 1998

[54] DEVICE AND METHOD FOR CONTROLLING PRESSURE IN A FLOWING VISCOUS MASS WITHIN A SYSTEM FOR PROCESSING CELLULOSE SOLUTIONS

[75] Inventors: Stefan Zikeli, Regau; Friedrich Ecker, Timelkam; Ernst Rauch, Schörfling; Arnold Nigsch, Vöcklabruck, all of Austria

[73] Assignee: Lenzing Aktiengesellschaft, Lenzing, Austria

[21] Appl. No.: 471,567

[22] Filed: Jun. 6, 1995

[30] Foreign Application Priority Data

Aug. 10, 1994 [AT] Austria ..................................... 1560/94

[51] Int. Cl.⁶ ................................ B01F 5/00; B28B 3/20; B28B 17/00
[52] U.S. Cl. ...................... 366/176.4; 366/349; 366/348; 425/149; 425/382.4; 264/176.1
[58] Field of Search ................................. 366/76.7, 176.3, 366/176.4, 190, 189, 336, 338, 339, 348, 349, 182.1, 182.2; 138/31; 425/49, 382.4; 264/176.1

[56] References Cited

U.S. PATENT DOCUMENTS

| | | | |
|---|---|---|---|
| 3,706,827 | 12/1972 | Nott et al. | 264/176.1 |
| 3,807,909 | 4/1974 | St. Clair. | |
| 4,196,282 | 4/1980 | Franks et al. | |
| 4,246,221 | 1/1981 | McCorsley, III | 264/203 |
| 4,422,842 | 12/1983 | Monnet | 425/561 |
| 4,542,686 | 9/1985 | Bansal | 366/336 |
| 4,941,751 | 7/1990 | Muhlbauer | 366/182.1 |
| 5,011,399 | 4/1991 | Farrell | 425/557 |
| 5,094,690 | 3/1992 | Zikeli et al. | 106/200.3 |
| 5,397,180 | 3/1995 | Miller | 366/338 |
| 5,403,178 | 4/1995 | Steger | 425/557 |

FOREIGN PATENT DOCUMENTS

| | | |
|---|---|---|
| 397043 | 6/1993 | Austria. |
| 13656 | 7/1980 | European Pat. Off.. |
| 127885 | 12/1984 | European Pat. Off.. |
| 250695 | 1/1988 | European Pat. Off.. |
| 356419 | 2/1990 | European Pat. Off.. |
| 572369 | 12/1993 | European Pat. Off.. |
| 1914909 | 10/1969 | Germany. |
| 3416899 | 11/1985 | Germany. |
| 841403 | 7/1960 | United Kingdom. |
| WO94-02408 | 2/1994 | WIPO. |
| WO94/06530 | 3/1994 | WIPO. |

OTHER PUBLICATIONS

English language abstract of EP 13,656.

Primary Examiner—Tony G. Soohoo
Attorney, Agent, or Firm—Baker & Botts, L.L.P.

[57] ABSTRACT

A device for controlling pressure in a flowing viscous mass includes an inlet, a guiding element having a receiving capacity for the mass flowing from the inlet, a piston movable within the guiding element, and a receptacle which telescopically slides over the inlet when the piston moves.

11 Claims, 5 Drawing Sheets

DEVICE AND METHOD FOR CONTROLLING PRESSURE IN A FLOWING VISCOUS MASS WITHIN A SYSTEM FOR PROCESSING CELLULOSE SOLUTIONS

The present invention is concerned with a device for controlling pressure in a flowing viscous mass and an arrangement for the production of cellulose moulded bodies. In particular, the present invention is concerned with a device for controlling pressure in a flowing, highly viscous cellulose solution, such as a mouldable solution of cellulose in a tertiary amine-oxide, which is transported from a solution production unit to a forming tool.

BACKGROUND OF THE INVENTION

In order to produce fibres, films or other moulded bodies from a starting material such as a polymer solution or thermoplastic resin in a continuous manner and constant high quality, it is not only necessary that the chemical/physical properties of the starting material remain unchanged, but also that at the forming tool, that is to say at the spinneret or film extrusion head, the same conditions always prevail. For this purpose, the uniformity of the spinning pressure is of vital importance. At normal operation of an industrial-scale arrangement, this condition will be usually fulfilled, but if in some cases starting material is diverted or withdrawn before reaching the forming tool, e.g. when backwashing a filter or for some other purpose, the spinning pressure naturally will drop. In this case, appropriate devices for the compensation of the diverted starting material must be provided in order to avoid a drop of the pressure. Such a device is known for instance from AT-B 397 043, which will be described in more detail below.

On the other hand, it may occur that the feeding of starting material to the forming tool has to be interrupted altogether, for instance in order to exchange the forming tool. Such an interruption however should not affect the production of the starting material, since stopping and restarting the production process involves the risk of temporarily not being able to assure the constant quality of the starting material. Thus it is necessary, so as not to have to interrupt the continuous production of starting material, to provide some kind of reservoir able to take up the starting material produced during the period of time in which no starting material can be processed by the forming tool. Such a device is known from WO 94/02408, which will be described in more detail below.

From GB-A-841,403, a device is known by which a viscous material such as margarine can be delivered intermittently. This device has a cylindrical reserve chamber in which a piston moves, delivering the margarine in portions. The margarine is pushed into the reserve chamber in opposite direction to the front of the piston, diverted and delivered intermittently in the opposite direction. It is not mentioned whether such a device is also appropriate for the continuous delivery of a highly viscous material.

From DE-A-3 416 899, a decorating machine capable of applying e.g. a chocolate mass to biscuits is known. Between the spraying nozzles on the one hand and a pump for the chocolate mass on the other hand, a cylinder is provided, a pneumatic cylinder acting on the piston of the former. Thus a uniform delivery of the chocolate mass from the spraying nozzle, independently of the pressure variations caused by the pump, is attained.

In some cases however, the device for controlling the magnitude of a mass flow and the compensation of pressure variations in a flowing, highly viscous mass is required to fulfill yet another condition: it must not exhibit any clearance volumes where starting material can accumulate. This is of special importance when the the properties of the starting material gradually change. Viscous polymer solutions or thermoplastic materials of one or more polymers generally have to be processed at elevated temperature. In such cases, it may occur that the polymer has, at the elevated temperature, only insufficient stability and is subjected to degradation reactions. These degradation reactions possibly may have even explosive character, thus representing a safety risk. These problems will be described in the following in more detail by means of Examples of solutions of cellulose in tertiary amine-oxides. For a general description of the production of solutions of cellulose in aqueous tertiary amine-oxides refererence is made to U.S. Pat. No. 4,196,282. In the following "NMMO" (=N-methylmorpholine-N-oxide) will be used instead of the term "tertiary amine-oxides".

The dissolution of cellulose in NMMO results in a partial degradation of the polymer cellulose chain. This partial degradation has a negative effect on the spinning security and on certain properties of the finished products, such as fibre strength, fibre elongation and loop strength.

Further it is known that cellulose solutions suffer gradual discolouring due to the degradation of the amine-oxide used. For instance, the monohydrate of NMMO is present under normal conditions as a white crystalline solid, which melts at 72° C. When heating the monohydrate, strong discolouring will occur from 120°/130° C. up. From 175° C. up, an exothermal reaction is triggered off, the melted mass being completely dehydrated and great amounts of gas developing which eventually lead to an explosion, the temperatures rising to far over 250° C. It is known that metallic iron and copper and particularly their salts significantly reduce the decomposition temperature of NMMO, while the decomposition rate is simultanously increased.

Additionally to the problems mentioned above, there is another difficulty, i.e. the thermal instability of the NMMO/cellulose-solutions themselves. This means that at the elevated processing temperatures (approximately 110°–120° C.), uncontrolable decomposition processes are triggered off in the solutions which due to the development of gases may lead to strong deflagrations, fires and even explosions.

In the literature, little is known about the correlations of the thermally unstable nature of the solution, that is to say the extrusion mixture. Particularly when metal ions are present, in certain cases a running-away of the decomposition reactions in the dope may occur. The presence of metal ions in the solution however can never be completely discarded due to the metal construction of the arrangement components, conveniently made of stainless steel.

Up to now, in the literature there has not yet been described a stabilisation measure capable of sufficiently stabilising cellulose and NMMO as well as reducing the thermal instability of the cellulose/NMMO-solution to such an extent that the explosive decomposition under process conditions may be avoided. It is evident that particularly the thermal instability of heated dopes is problematic, since in arrangement components having greater capacities such as buffer vessels, stirring vessels, mixing machines etc., these dopes represent a safety risk.

In order to control the explosion risk during the production of the solution and keep the thermal load on the solution low, it is known from EP-A-0356 419 to prepare the solution in a thin film treatment apparatus instead of in a stirring vessel or similar devices. In this process, the suspension of cellulose in NMMO, the NMMO having a water content of up to 40%, is spread as a layer along the heated surface of the Thin film treatment apparatus and transported, being exposed to elevated temperature and reduced pressure, in order to remove water until the cellulose dissolves. Thus it is possible to rapidly heat the suspension to the temperatures necessary for the preparation of the solution in an economical way, and simultaneously to rapidly prepare the solution so as to avoid to a great extent a decomposition of the tertiary amine-oxide and a decomposition of cellulose. Moreover, the safety risk, compared to the preparation of the solution in a stirring vessel, is significantly reduced, since the solvent is not heated in a large amount at once, but only in comparatively small amounts.

Thus the process described in EP-A-0 356 419 reduces the safety risk occurring during the production of the cellulose solutions by technical measures. There is however still a risk of degradation of the cellulose and NMMO and exothermal reactions, deflagrations etc., when the finished solutions are processed, i.e. in the arrangement components provided between the thin film treatment apparatus and the forming tool. Such arrangement components include buffer or reserve vessels which for instance are disposed between a filter device which can be backwashed and the forming tool, in order to avoid as far as possible discontinuities in the flow of the dope towards the spinning machine when changing the filter or backwashing.

As mentioned above, such a filter device which can be backwashed having a reserve vessel joined thereto is known from AT-B 397 043. This device has been developed for a thermoplastic synthetic material and has a case in which two adjustable screen supporting members are arranged between an operation position and a backwash position. In the backwash position, the screen to be backwashed is downstream in open connection with the downstream side of the screen being in operating position. A narrow cylindrical reserve chamber having T-shape, in which a piston moves, is joined to the common discharge channel leading to the spinning machine. Before starting the backwash process, the piston is slowly withdrawn, whereby synthetic material is slowly diverted from the discharge channel. Conveniently, the synthetic material is diverted at such a reduced rate that no significant pressure drop occurs at the spinning machine. When the reserve vessel is filled with melted mass, the screen supporting member carrying the screen to be backwashed is changed to backwash position and backwashing is carried out by means of the piston such that the pressure at the spinning machine is at least approximately maintained.

This known device has the drawback that it is only able to immediately compensate a rapidly occurring pressure drop in the discharge channels if a certain amount of synthetic material is always present as a reserve in the cylindrical reserve chamber, which when required can be delivered by the piston immediately to the discharge channel. Naturally, this reserve material remains for hours in the cylindrical reserve chamber, being subjected during this time to various degradation reactions occurring on the cellulose and the NMMO. These degradation products contaminate the dope. Moreover, during its residence in the cylindrical reserve chamber this reserve material is contacted with a relatively big metal surface,.since the length/width-ratio of the reserve chamber is high, whereby an enrichment of metal ions at the contact surface to the cellulose solution is promoted. These metal ions may trigger off a thermal running-away of the decomposition reactions up to the point of an explosive decomposition.

WO 94/02408 is concerned with a process for storing a liquid, highly viscous medium in a tank having an adjustable capacity. This storage tank is disadvantageous for mouldable solutions of cellulose in tertiary amine-oxides for two reasons. First, in a continuous process for the production of cellulose objects, storing of starting material, i.e. the thermally unstable cellulose solution, in a tank should be avoided altogether. As mentioned above, during the residence time of the cellulose solution the cellulose and the tertiary amine-oxide are subjected to degradation, the products of which deteriorate the quality of the moulded bodies. Second, in the proposed tank a continuous passing of the highly viscous solution is not ascertained due to its complex configuration. In consequence, a flow profile is formed with areas where one part of the cellulose solution flows more quickly than other parts.

When the tank for highly viscous cellulose solutions described in WO 94/02408 is employed, this flow profile is so pronounced that at some sites the cellulose solution flows only very slowly or not at all. This is disadvantageous, since not only the residence time of the thermally unstable solution is increased, but also because cellulose solution accumulates at some sites, so-called clearance volumes, and is enriched with metal ions due to its contact with metal surfaces, increasing the risk of an intense decomposition reaction.

Ideally, a device for controlling pressure in a flowing, highly viscous cellulose should be such that the solution, when passing the device, is passed on uniformly like a plug, not adopting any flow profile.

SUMMARY OF THE INVENTION

Thus it is the object of the present invention to provide a device for controlling pressure in a flowing viscous mass fulfilling the following conditions:

1. the device must be able to respond immediately to a pressure drop, compensating with additional starting material; this starting material however must not have been diverted before from the main stream, as is the case in the device according to AT-B 397 043;

2. the device should not have any clearance volume where starting material can accumulate;

3. the device must have a simple configuration and be simple to operate;

4. the device must be designed such that the residence time of the starting material in the device is as short as possible, i.e. that a flow profile according to which part of the viscous mass is transported at a significantly lower rate is avoided; and 5. the device must be designed such that the starting material has as little contact as possible with metal surface.

The device according to the invention for controlling pressure in a flowing viscous mass is characterized by:

an inlet through which the mass flows into the device, a guiding element having a receiving capacity for the mass flowing from the inlet, a piston having an aperture, which piston is movable within the guiding element, the receiving capacity of the guiding element being varied by moving the piston, a receptacle attached to said aperture at said piston and joined to the inlet, so that the flowing mass passes from the inlet through the receptacle and the aperture of the piston into the guiding element, an outlet into which the guiding element leads and by means of which the flowing mass is delivered from the device, provided that the inlet, the guiding element and the receptacle are designed in a pipe-shape and that the receptacle slides over the inlet like a telescope when the piston is moving.

A preferred embodiment of the device according to the invention consists in that the piston is joined to a static mixer being movable in the guiding element and moving together with the piston.

Preferably, the guiding element has a pressure chamber into which a fluid such as a gas or a hydraulic oil which is pressurized and able to move the piston may be introduced through an aperture.

It has been shown that the device according to the invention is particularly appropriate for use in the processing of cellulose solutions. Thus the invention is also concerned with the use of the device according to the invention in processing mouldable cellulose solutions, wherein as the mouldable cellulose solution particularly a solution of cellulose in an aqueous NMMO is used.

Further, the invention is concerned with an arrangement for the production of cellulose moulded bodies, said arrangement comprising:

a mixer wherein a suspension is produced from shredded cellulose and an aqueous solution of a tertiary amine-oxide, a thin film treatment apparatus, which is joined to the mixer by means of a pipe and wherein by using the thin-film technique water is evaporated from the suspension at elevated temperature and reduced pressure until a cellulose solution is produced, which is removed from the thin film treatment apparatus, a device according to the invention joined to the thin film treatment apparatus either directly oder indirectly by means of a pipe and a forming tool joined to the device according to the invention by means of a pipe.

For those skilled in the art it is evident that the components of the arrangement have to be adjusted to each other so that a continuous operation is possible. Naturally, the thin film treatment apparatus which is joined for the production of the solution has to be dimensioned, with regard to its heated surface, according to the amount of suspension to be processed.

The arrangement according to the invention is superior in that failures in the production and during processing originating from pressure variations in the flowing cellulose solution can be avoided.

The applicant has carried out studies about the residence times of the suspension ingredients and the cellulose solution in each of the components of the arrangement, discovering that the device according to the invention offers a significantly reduced residence time compared to conventional buffer and storing tanks. Also, the device according to the invention can be easily adjusted to different capacities and output amounts of an arrangement wherein it is used. A combination of a thin film treatment apparatus with the device according to the invention is particularly appropriate.

The device according to the invention has to be dimensioned according to the throughput through the thin film treatment apparatus, corresponding, expressed in percentage, to the so-called "hold-up" (flow profile of the film zone along the apparatus length) of the thin film treatment apparatus.

A preferred embodiment of a thin film treatment apparatus is a "Filmtruder" of the company Buss AG, Switzerland. The smallest commercially available Filmtruder has a heat transmission surface of 0,5 $m^2$ which permits, according to the description of the company and the explanations of EP-A-0 356 419 and the process parameters described therein, a mass throughput of from 64 to 72 kg/h. This amount corresponds to a dope output of 128–144 kg/$m^2$h. In this Filmtruder a hold-up of about 2 l will be produced, corresponding to approximately 2% of the mass throughput, which has turned out to be the desirable pressure compensation volume of the device according to the invention combined with a Filmtruder.

Further, it has been found that the desired pressure compensation volume of the device according to the invention for the compensation of pressure should be approximately 2–6% of the dope throughput, corresponding to the hold-up volume of the Filmtruder, i.e. the flow profile of the film zone. Therefore, when using a big Filmtruder having 40 $m^2$ of heated surface, the adaptation of the device according to the invention is based on the experience gained from EP-A-0 356 419, a specific mass throughput of 128–144 kg/$m^2$h being multiplied with a heated surface of e.g. 40 $m^2$, resulting in a mass throughput through that Filmtruder of 5120–5760 kg/h.

Thus the volume for this big Filmtruder for the device according to the invention is to be from 100 to 300 l, corresponding again to the hold-up volume of the Filmtruder. Due to the fixing of the length/diameter-ratio in the device according to the invention, predictable for those skilled in the art, the construction and production of the required pressure compensation volume can be provided for in a simple way.

Thus the invention is further concerned with an arrangement for the production of mouldable solutions of cellulose in aqueous tertiary amine-oxides, characterized by the combination of a thin film treatment apparatus, wherein by using the thin-film technique water is evaporated at elevated temperature and reduced pressure from a suspension of cellulose in an aqueous tertiary amine-oxide until a cellulose solution is produced, which is removed from the thin film treatment apparatus, and a device according to the invention joined either directly or indirectly to the thin film treatment apparatus by means of a pipe.

BRIEF DESCRIPTION OF THE DRAWINGS

The invention will be more readily understood from the following detailed description thereof, taken in conjunction with the appended drawings, in which

FIGS. 2b and 2c are enlarged views of specific features of the device of FIG. 2a;

FIG. 3b is an enlarged view of a feature of the device of FIG. 3a.

DETAILED DESCRIPTION OF THE PREFERRED EMBODIMENTS

Figure 1:
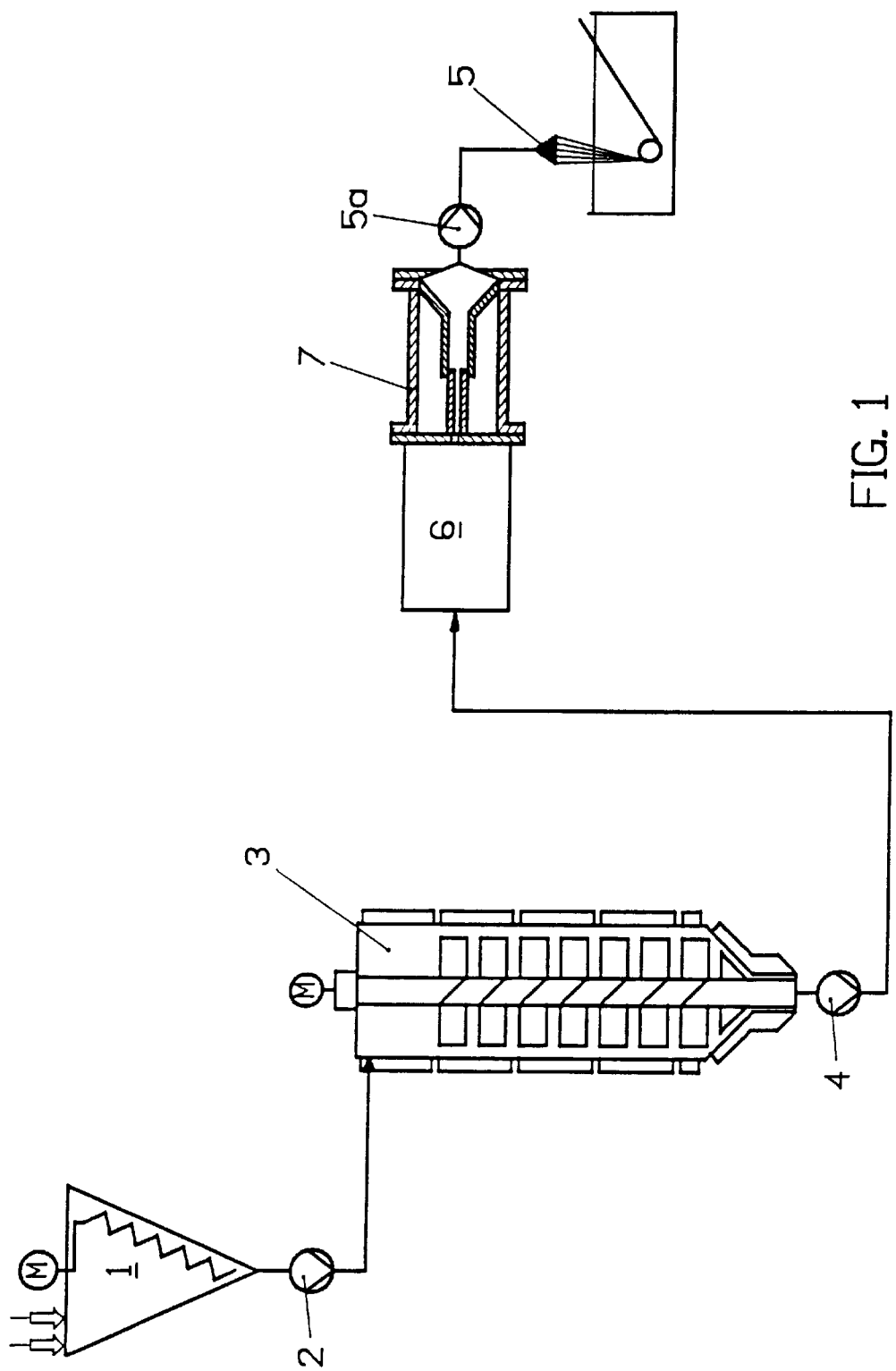
FIG. 1 illustrates schematically an arrangement for the production of cellulose fibers from a suspension of shredded cellulose in aqueous NMMO.

FIG. 1 schematically shows the configuration of an embodiment of the arrangement according to the invention for the production of a mouldable solution of cellulose in aqueous NMMO which is spun to fibres. It is pointed out that for reasons of clarity in the Figure the different components of the arrangement are not illustrated at the same scale.

In FIG. 1, 1 denotes a mixer, for instance a cone mixer, into which shredded cellulose and an aqueous NMMO solution are fed. The feeding thereof is indicated by means of two arrows.

In the cone mixer 1, the cellulose and the aqueous NMMO solution are mixed to form a suspension. The mixing arm of the cone mixer and the driving element of the mixing arm are shown by a zigzag line and the letter M respectively. The suspension obtained contains of from 9 to 13% by mass of cellulose, of from 65 and 63% by mass respectively of NMMO and water for the rest.

The suspension is removed by means of a pump 2 and fed into a Filmtruder 3, wherein by means of the thin-film technique water is withdrawn, while applying reduced pressure and elevated temperature, until the cellulose dissolves. This kind of preparation of the cellulose solution is described in detail in U.S. Pat. No. 5,094,690 of the applicant, to which we refer for further information. Thin film treatment apparatus are known in the art and are made among other producers by the company Buss AG, Switzerland, under the trade mark Filmtruder. By means of a pump 4, the ready cellulose solution is removed from the Filmtruder.

Reference number 6 generally refers to a component of the arrangement which can be provided optionally and may give rise to pressure variations. It may be for instance a device for the feeding of additives, leading to a pressure increase at the spinning pump 5a due to the volume increase of the flowing cellulose solution. It may also be a device by means of which part of the cellulose solution flowing to the spinneret 5 is diverted in certain intervals for other purposes. This is the case e.g. with a backwash filter, which usually is provided upstream to a forming tool, or when switching between two parallely operated polymer melt filter cartridges, for instance when one filter unit has to be removed in order to be cleaned and it is necessary to switch to the other for maintaining the flow. Backwash filters are known to those skilled in the art and described for instance in EP-A-0 572 369 of the applicant or in EP-A -0 250 695.

Reference number 7 refers to an embodiment of the device according to the invention which in the present case is attached by flange to a component 6 of the arrangement. When cellulose solution is diverted in component 6 of the arrangement, this diverted amount of cellulose solution may be compensated by means of the device 7 according to the invention, thus avoiding a pressure drop at spinneret 5. Therefore it is not necessary to interrupt the spinning process, which may be continued practically under the same pressure, no discontinuity in spinning occuring.

On the other hand, when for some reason spinneret 5 is exchanged, the flow of cellulose solution to spinneret 7 naturally having to be stopped, the device according to the invention is able to take up the amount of cellulose solution discharged by Filmtruder 3 in the interval of time in which the flow of cellulose solution is interrupted. Thus it is not necessary to interrupt the operation of the Filmtruder, no discontinuity in the quality of the cellulose solution occurring.

In the following, the precise configuration of the device 7 according to the invention and its mode of operation will be described in detail by means of FIG. 2.

Figure 2A:
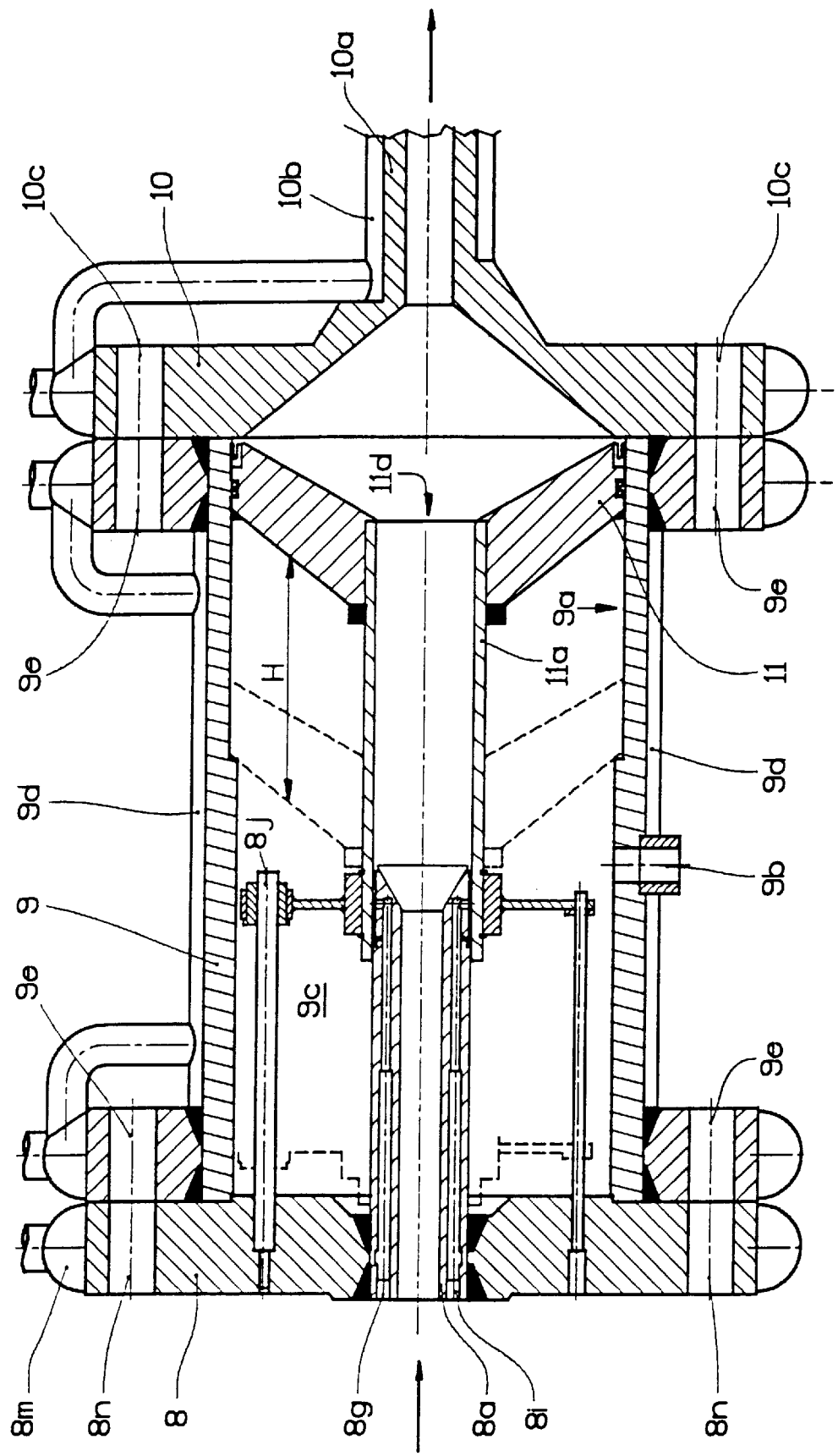
FIG. 2a is a cross-sectional view of one embodiment of the pressure controlling device of the invention.

FIG. 2a shows a section of the device according to the invention in its simplest embodiment. It consists substantially of 4 elements: the two blind flanges 8 and 10, the cylindrical guiding pipe 9 and the piston 11 which is arranged movably in the guiding pipe. The maximum stroke and the direction of movement of the piston 11 are indicated by the letter H and a double arrow respectively. In FIG. 2a, the piston 11 is shown in its utmost right position. In the following, this position will be referred to as minimum position, since in this case only a minimum amount of cellulose solution is taken up in the device according to the invention. When piston 11 is moved to the left by stroke H, it is located in the maximum position, since in this case a maximum of cellulose solution is contained in the device according to the invention. This maximum position of piston 11 is shown in FIG. 2a by a dotted line.

Piston 11 has a receptacle 11a located over an inlet pipe 8a attached to the blind flange 8, which when piston 11 moves towards the maximum position progressively slides over inlet pipe 8a like a telescope. Thus, when piston 11 is moving, it not only is guided by the cylindrical wall 9a of guiding pipe 9, but also by inlet pipe 8a of blind flange 8.

The mode of operation of the device according to the invention is as follows:

Cellulose solution flows e.g. from the arrangement component 6 shown in FIG. 1 through inlet pipe 8a having at its end a conic enlargement and through receptacle 11a and leaves the device according to the invention through outlet pipe 10a attached to blind flange 10 and leading directly to the spinneret (not shown). When in case of exchanging the spinneret the feeding of cellulose solution from outlet pipe 10a has to be stopped, the pressure of the cellulose solution continuing to flow constantly through inlet pipe 8a into the device according to the invention would increase. This pressure increase however is compensated by means of the displacement of piston 11, according to the amount of fed cellulose solution, towards the left towards the maximum position. Thus this measure provides space for the cellulose solution flowing into the device according to the invention while the spinneret is being changed. When the new spinneret is operative, outlet pipe 10a is opened again, the movement of piston 11 simultaneously being stopped, thus being restarted the spinning operation, since cellulose solution is again fed continuously from outlet pipe 10a to the spinneret. The cellulose solution taken up by the device according to the invention in its guiding pipe 9 during the stopping of the spinning operation may be fed additionally to the spinneret by moving towards the minimum position, this step conveniently being carried out over a prolonged period of time in order not to significantly increase the pressure and the output amount at the spinneret.

On the other hand, when for some reason the feeding of cellulose solution to inlet pipe 8a has to be reduced, first a reserve of cellulose solution is taken up by the device according to the invention, piston 11 moving to its maximum position, thus providing space for said reserve of cellulose solution. When subsequently feeding of cellulose solution to inlet pipe 8a is reduced, e.g. in order to divert cellulose solution for other purposes (e.g. for backwashing a filter), it may be avoided that a pressure drop in the cellulose solution caused by this measure affects the spinneret by moving piston 11 at an appropriate rate towards the minimum position, thereby increasing the transport of cellulose solution through outlet pipe 10a to the spinneret.

In an operating state wherein it is desired to respond immediately to positive or negative pressure variations, piston 11 is located preferably in a position between the minimum position and the maximum position. In this position, a sudden pressure drop in inlet pipe 8a may be immediately compensated by moving piston 11 towards the minimum position. It is important that the amount of cellulose solution necessary for the compensation of the pressure drop is not derived from a clearance volume, as is the case in AT-B-397 043, but from a space through which cellulose solution flows constantly, wherein the cellulose solution is constantly renewed and thus does not age.

A sudden pressure increase in outlet pipe 10a may be compensated by the immediate movement of the piston towards the maximum position.

In the following, some construction characteristics of the device according to the invention will be described in more detail.

The movement of piston 11 is controlled by means of an inert gas or by means of an hydraulic oil fed into the pressure chamber 9c at the gas aperture 9b of guiding pipe 9. When it is desired to move piston 11 towards the minimum position, the gas pressure in pressure chamber 9c must be higher than the pressure prevailing in the cellulose solution. On the other hand, piston 11 may be moved towards the maximum position by reducing the gas pressure below the pressure of the cellulose solution. Conveniently, the gas pressure is controlled continuously. Thus it is also possible to move piston 11 continuously. The adjustment of the gas pressure may be carried out in a known way, e.g. by means of a blast box, and is not shown in FIG. 2a.

Figure 2B:
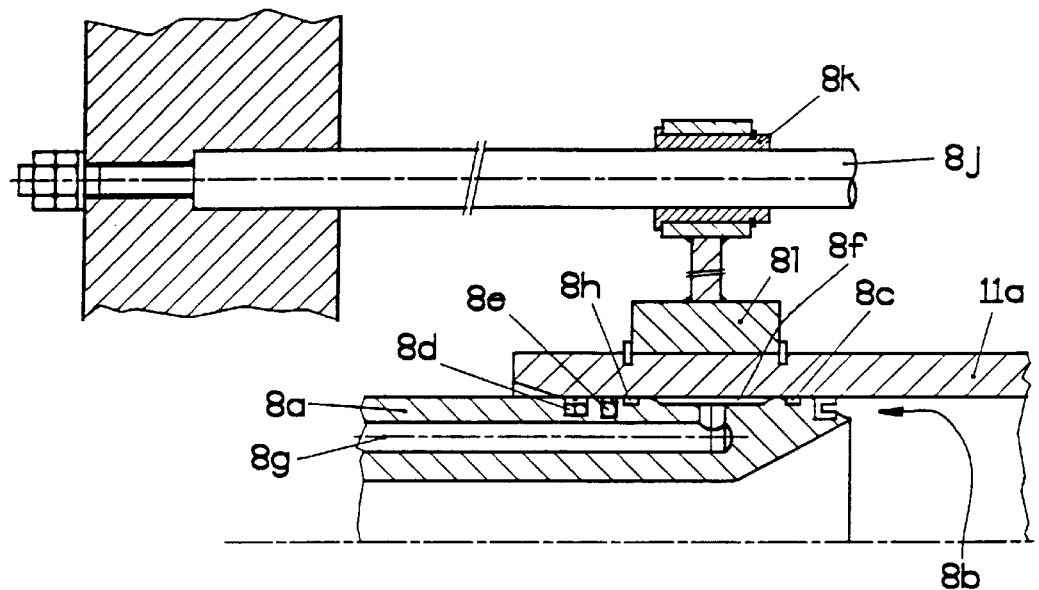

The sealing of pressure chamber 9c against the cellulose solution in receptacle 11a is shown at an enlarged scale by means of FIG. 2b, consisting in a sealing ring 8d fitted into inlet pipe 8a and a wiping ring 8e which avoids a contamination of sealing ring 8d. Behind wiping ring 8e, a guiding ring 8h is fitted into inlet pipe 8a.

The sealing of the cellulose solution against pressure chamber 9c can also be seen in detail from FIG. 2a, consisting in a sealing ring 8b having a U-shaped section which avoids the penetration of cellulose solution into pressure chamber 9c. Directly behind sealing ring 8b, a guiding ring 8c is located for guiding the receptacle 11a at inlet pipe 8a.

A space 8f between guiding rings 8c and 8h as well as receptacle 11a and inlet pipe 8a is provided for the purpose of rinsing and lubricating and is fed with lubricant through lubricating conduit 8g. The lubricant is withdrawn through conduit 8i (see FIG. 2a).

Figure 2C:
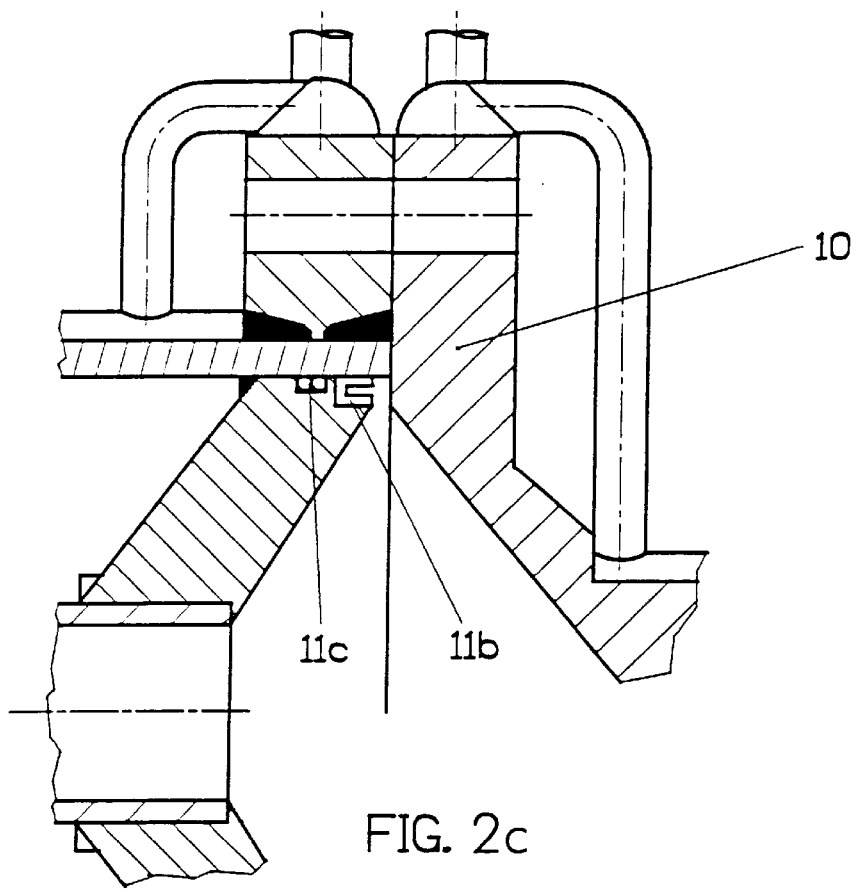

The sealing of the cellulose solution against pressure chamber 9c at piston 11 is shown at an enlarged scale by means of FIG. 2c and is also carried out by means of a sealing ring 11b having a U-shaped section. Behind it a guiding ring 11c is fitted in. The sealing of pressure chamber 9c against the cellulose solution is not shown in FIG. 2c and conveniently is arranged analogously to the case shown in FIG. 2b (sealing ring 8d, wiping ring 8e and guiding ring 8h).

For the sealing of pressure chamber 9c and the cellulose solution against its surroundings, in blind flanges 8 and 10 O-seals are provided in known manner.

The position of piston 11 within the device according to the invention may be determined in a known manner, i.e. by means of a transsonic displacement transducer 8j (FIG. 2b) of the BALLUF BTL type (made by the company Balluf, Germany), fixed within blind flange 8. The positioner block 8k is attached to receptacle 11a by means of a ring 8l, thus recognizing any position of receptacle 11a between the minimum position and the maximum position of piston 11. The signal provided by transsonic displacement transducer 8j may be used as a control signal in a variety of ways.

Each of the two blind flanges 8 and 10 and guiding pipe 9 have heating jackets 8m, 10b and 9d respectively, by means of which they may be heated indirectly from the outside.

The rigid connection of blind flanges 8 and 10 to the guiding pipe 9 is achieved in a known way by means of screws, which are conducted across bore holes 8n, 10c and 9e respectively.

Figure 3A:
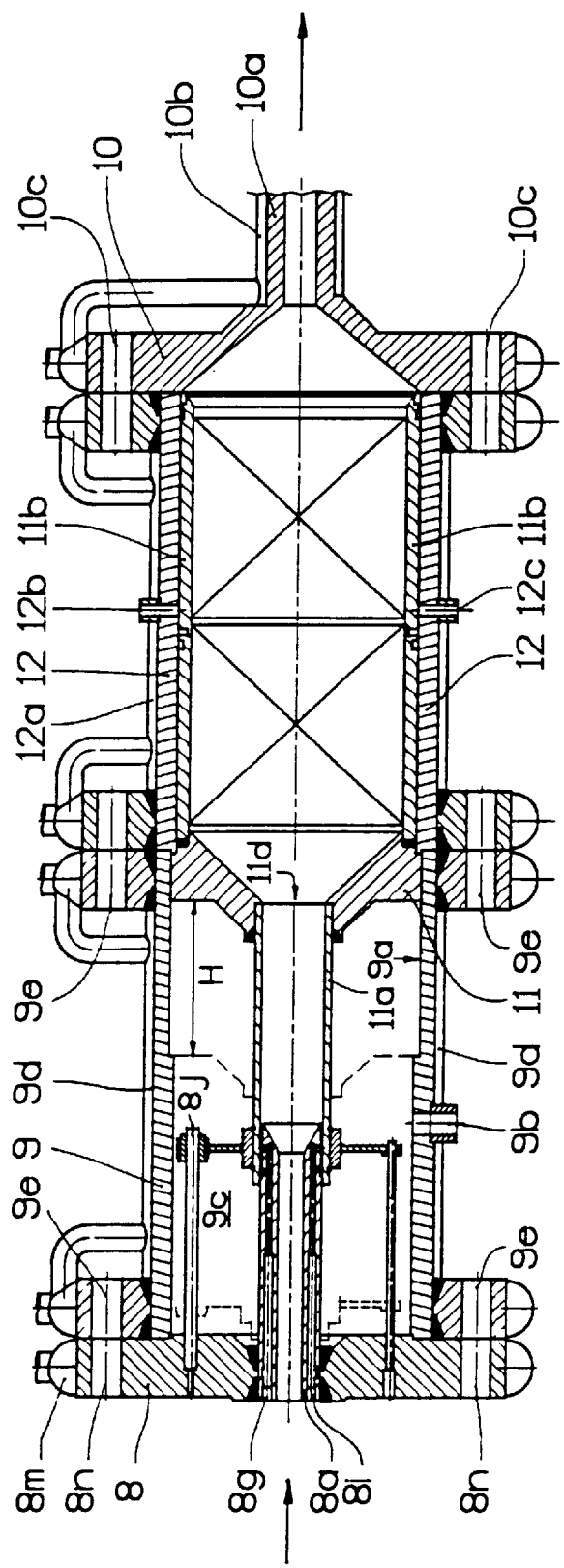
FIG. 3a is a cross-sectional view of another embodiment of the pressure controlling device of the invention.

A preferred embodiment of the device according to the invention is shown in FIG. 3a by means of a section, wherein components of the device also indicated in FIGS. 2a, 2b and 2c have been designated with identical reference numbers.

The embodiment shown in FIG. 3a differs from that shown in FIG. 2a by another (second) guiding pipe 12 provided between blind flange 10 and guiding pipe 9 of FIG. 2a and by a static mixer 11b welded to the circumference of piston 11 and moving together with piston 11. This static mixer is a pipe wherein baffles are provided which affect the flow of the cellulose solution such that it basically does not exhibit a profile, i.e. that it flows like a plug. Such static mixer elements are known and are made e.g. by the company Sulzer Chemtech, Switzerland. In the Figure, the baffles are indicated by means of two crosses.

In the minimum position of piston 11 shown in FIG. 3a, static mixer 11b immerses completely into the second guiding pipe 12, in this position closing evenly with blind flange 10. The sealing of the cellulose solution against pressure chamber 9c at the front end of the static mixer is in principle disposed analogously to the sealing at piston 11 shown in FIG. 2c, i.e. by means of a sealing ring having a U-shaped section to which a guiding ring is joined (both not shown).

Figure 3B:
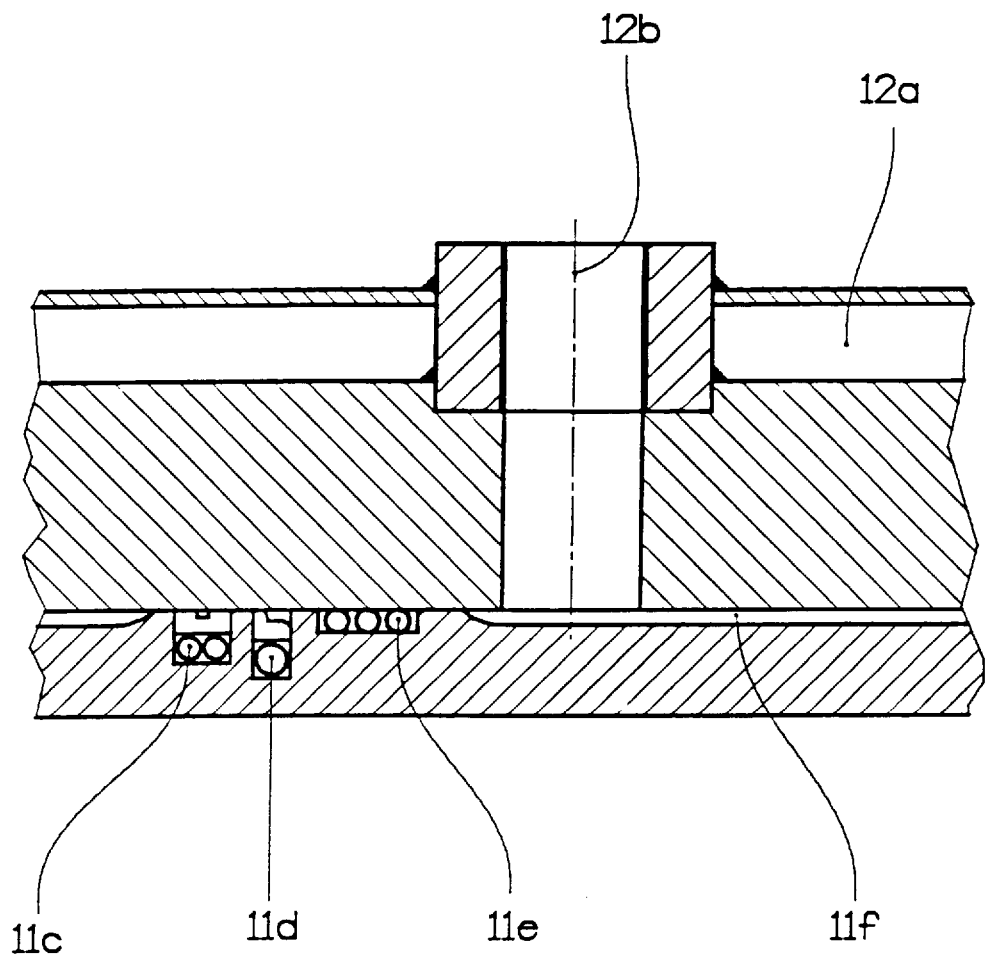

The sealing of pressure chamber 9c against the cellulose solution is provided at the external circumference of static mixer 11b by means of a sealing ring 11c and is shown at an enlarged scale in FIG. 3b. Also in this case, immediately behind sealing ring 11c a wiping ring lid for the protection of sealing ring 11c against contamination is provided. Static mixer 11b is conducted in the second guiding pipe 12 by means of guiding ring 11e provided behind it. Space 11f is provided for lubrication purposes, the feeding and withdrawal of lubricant being carried out through apertures 12b and 12c respectively.

The static mixer may be heated indirectly from the outside by means of heating jacket 12a.

It has been shown that the incorporation of a static mixer in the device according to the invention is particularly advantageous when processing the thermally unstable cellulose solutions in order to obtain a good plug flow and reduced residence time. Besides, it is also advantageous to use static mixers wherein the interior parts may be fed with heating medium/cooling medium, thus being possible to additionally heat/cool the flowing cellulose solution.

We claim:

1. A device for controlling pressure in a flowing viscous mass, comprising:
    an inlet pipe through which the mass flows into the device, the inlet pipe having an outer surface;
    a guiding element including a chamber having a receiving capacity for the mass flowing from said inlet;
    a piston having an aperture, the piston being movable within said guiding element, the receiving capacity of said guiding element being varied by moving said piston;
    a receptacle attached to said aperture at said piston and joined to said inlet such that the flowing mass passes from said inlet through said receptacle and through said aperture of piston into said guiding element; and an outlet into which said guiding element leads and whereby the flowing mass is discharged from the device, wherein said inlet, said guiding element and said receptacle are designed in a pipe-shape and said receptacle telescopically sliding over the outer surface of said inlet pipe when said piston is moving.

2. A device according to claim 1, wherein said piston is joined to a static mixer, the static mixer being movable within said guiding element in conjunction with said piston.

3. A device according to claim 1 or claim 2, wherein said guiding element has a pressure chamber and an aperture through which a fluid may be fed into the pressure chamber for moving said piston.

4. An arrangement for the production of moldable solutions of cellulose in aqueous tertiary amine-oxides, comprising:

a thin film treatment apparatus for evaporating water from a suspension of cellulose in aqueous tertiary amine-oxide at elevated temperature and reduced pressure until a moldable cellulose solution is produced and removed from said thin film treatment apparatus; and a device as in claim 1 or claim 2 joined to said thin film treatment apparatus by means of a pipe.

5. An arrangement for the production of cellulose moulded bodies, comprising:

a mixer wherein a suspension is produced from shredded cellulose and an aqueous tertiary amine-oxide;

a thin film treatment apparatus joined to said mixer by means of a pipe wherein water is evaporated from said suspension at elevated temperature and reduced pressure until a cellulose solution is produced and removed from said thin film treatment apparatus;

a device as in claim 1 or claim 2 joined to said thin film treatment apparatus by means of a pipe; and a forming tool joined to said device by means of a pipe.

6. An arrangement for the production of mouldable solutions of cellulose in aqueous tertiary amine-oxides, comprising:

a thin film treatment apparatus for evaporating water from the suspension at elevated temperature and reduced pressure until a mouldable cellulose solution is produced and removed from said thin film treatment apparatus; and a device as in claim 3 joined to said thin film treatment apparatus by means of a pipe.

7. An arrangement for the production of cellulose moulded bodies, comprising:

a mixer wherein a suspension is produced from shredded cellulose and an aqueous tertiary amine-oxide;

a thin film treatment apparatus joined to said mixer by means of a pipe wherein water is evaporated from said suspension at elevated temperature and reduced pressure until a cellulose solution is produced and removed from said thin film treatment apparatus;

a device as in claim 3 joined to said thin film treatment apparatus by means of a pipe; and a forming tool joined to said device by means of a pipe.

8. A method for controlling pressure in a flowing viscous mass comprising the steps of:

providing a device having inlet means, a guiding element, a piston having an aperture and being movable within said guiding element, a receptacle coupled to said aperture and an outlet for said guiding element, said guiding element and said receptacle being pipe shaped and said receptacle slidable over the outer surface of said inlet means when said piston is moving, supplying a viscous mass to said inlet means, receiving a quantity of said viscous mass in said guiding element, moving said piston to vary the receiving capacity of said guiding element and to control the pressure on the viscous mass in said guiding element, and discharging said viscous mass through said outlet at a desired pressure.

9. The method of claim 8, further comprising, providing a static mixer in said guiding element wherein said static mixer is movable with said piston, and mixing said viscous mass with said static mixer.

10. The method of claim 8 or claim 9, comprising supplying a mouldable cellulose solution to said inlet means.

11. The method of claim 8 or claim 9 comprising supplying a solution of cellulose in an aqueous tertiary amine-oxide to said inlet means.

* * * * *